ically tested by the detecting circuit 4, the scanning mechanism being advanced by one line when the information having been detected is one to be skipped, the number of lines to be consecutively skipped is counted by the counter, the phase signal and the image signal being transmitted when the counted value is 0, and the sub-scanning controlling signal corresponding to the counted value being transmitted from the beginning of the phase when the counted value is equal to or more than 1.

United States Patent [19]
Koguchi

[11] 4,356,516
[45] Oct. 26, 1982

[54] TRANSMITTER FOR FACSIMILE
[75] Inventor: Kenji Koguchi, Tokyo, Japan
[73] Assignee: Xerox Corporation, Stamford, Conn.
[21] Appl. No.: 235,410
[22] Filed: Feb. 17, 1981
[30] Foreign Application Priority Data
  Feb. 15, 1980 [JP] Japan .......................... 55/17136[U]
[51] Int. Cl.³ .............................................. H04N 1/36
[52] U.S. Cl. ..................................... 358/288; 358/267
[58] Field of Search ................................ 358/288, 267
[56] References Cited
U.S. PATENT DOCUMENTS

| 3,201,512 | 8/1965 | Mason ................................... 358/288 |
| 3,448,207 | 6/1969 | Green .................................... 358/288 |
| 3,502,803 | 3/1970 | Bigenwald .......................... 358/288 |
| 4,302,781 | 11/1981 | Ikeda .................................... 358/288 |

Primary Examiner—Howard Britton
Attorney, Agent, or Firm—Franklyn C. Weiss

[57] ABSTRACT

A facsimile transmitter which allows faster scanning and transmission of information on a document by skipping over blank areas on said document and comprises a phase signal generating circuit 7 for generating a phase signal, a reading scanning circuit 1 for reading an original document, memory circuits 2, 3 for storing an image signal for one line, a detecting circuit 4 for testing whether or not the image signals for one line are all white signals, a counting circuit 5 for counting signals being generated by the detecting circuit, a sub-scanning mechanism 8 for performing skips by one line on the original document, a clock controlling circuit 6 for controlling the reading scanning circuit 1, the memory circuits 2, 3, and the sub-scanning circuit 8, an oscillator circuit 9 being controlled by the counted value of the counting circuit 5, and a gate controlling circuit 12 being controlled by the count value in said counter circuit, wherein the content of image information having been obtained by the prior scanning of one line is sequentially tested by the detecting circuit 4, the scanning mechanism being advanced by one line when the information having been detected is one to be skipped, the number of lines to be consecutively skipped is counted by the counter, the phase signal and the image signal being transmitted when the counted value is 0, and the sub-scanning controlling signal corresponding to the counted value being transmitted from the beginning of the phase when the counted value is equal to or more than 1.

8 Claims, 3 Drawing Figures

TRANSMITTER FOR FACSIMILE

A transmitter for facsimile which allows faster scanning and transmission of information on a document by skipping over blank areas on said document.

The invention relates to a facsimile transmitter of the type in which the portion requiring no transmission such as a blank space on a document is fast forwarded in an auxiliary scanning direction to effect the transmission and reception thereby to shorten the communication time.

BACKGROUND OF THE INVENTION

There has conventionally been proposed a variety of line skipping devices of this kind, most of which insert the skip signal, which is to be transmitted from the transmitter in order to skip the auxiliary scan at the receiver side, into a phase signal period and transmit that skip signal. As a result, each pulse width of the skip signal is restricted not only by the mechanically responding speed of the auxiliary scanning mechanism but also by the time width of the phase signal period, which is selected at a relatively narrow value. Even if these are taken into consideration, the skip pulses, which can be inserted into the blank space between each adjacent phase signal, are at most several in number.

As a result, in case there appears such a blank space in a copy extending over several scan lines, the effect of the so-called "line skip" cannot be exhibited to a sufficient extent. Moreover, since the extraction and reproduction of the skip pulses have to be accomplished within a short period which is named the "phase signal period", the conventional skipping devices have a disadvantage that the circuit construction at the receiver has to be made complex.

The present invention eliminates the aforementioned disadvantages concomitant with the prior art by utilizing a facsimile transmitter which can sufficiently exhibit the line skipping effect even if a blank space continuously appears in a copy and which can transmit such a signal as facilitates the recognition between an auxiliary scanning control signal and a picture signal at the receiver location.

According to the present invention, disclosed is a facsimile system which allows faster scanning and transmission of information on a document by skipping over blank areas on a document and comprises a phase signal generating circuit for generating a phase signal, a reading scanning circuit for reading a copy, memory circuits for storing a picture signal for one line, a testing circuit for testing whether or not said picture signal for one line is a full-line white signal, a counter circuit for counting the signal which is generated by said testing circuit, an auxiliary scanning mechanism for skipping each blank line in the copy, a clock control circuit for controlling said reading scanning circuit, memory circuits and auxiliary scanning mechanism, and an oscillator circuit being controlled by said counter circuit, and a gate control circuit adapted to be controlled by the counted value of said counter circuit, characterized in that the content of the picture information, which is obtained by the precedent scanning operation of each line, is consecutively tested for each line by said testing circuit so that said scanning mechanism is made to skip each line in case the line information tested is to be skipped; and in that how many lines are continuously skipped is counted by said counter circuit so that said phase signal and picture signal are transmitted when the counted value is zero, and so that the auxiliary control signal according to the counted value is transmitted at the beginning of said phase signal when the counted value is equal to or larger than one.

DESCRIPTION OF THE DRAWINGS

For a more complete understanding of the invention, reference may be had to the following detailed description of the invention, in conjunction with the drawings wherein.

DETAILED DESCRIPTION OF THE INVENTION

Figure 1:
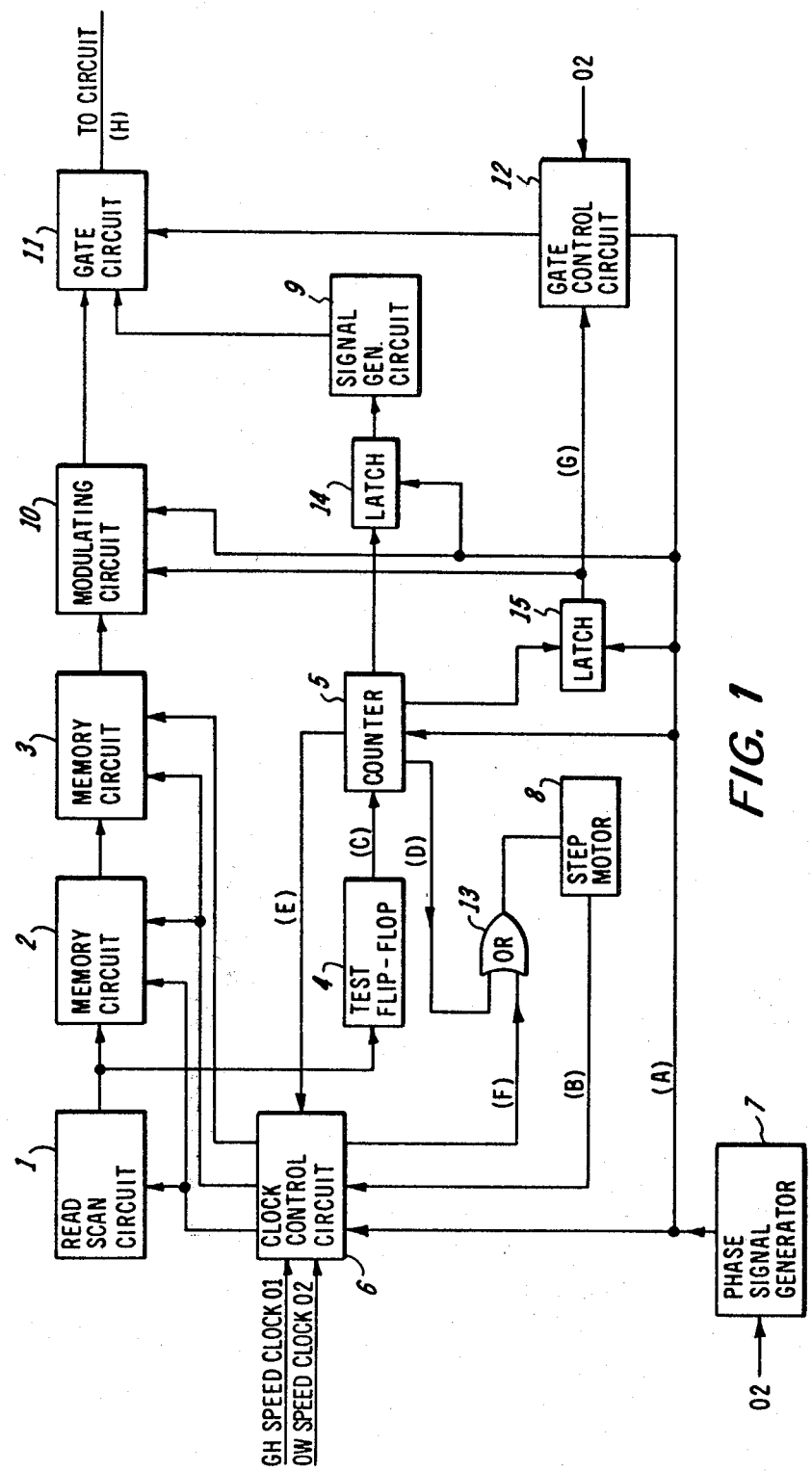
FIG. 1 is a block diagram of a facsimile transmitter in accordance with the principles of the present invention.

Indicated at reference numeral 1 in FIG. 1 is a reading scanning circuit which is composed of a solid scanning element and its accessory circuit for reading out one scan line of copy. Numerals 2 and 3 indicate memory circuits for buffer storing the picture signal for one scanning line. Numeral 4 indicates a testing circuit which is constructed of a flip-flop or the like for testing the content of the picture signal for one scan line. Numeral 5 indicates a counter circuit which is constructed of a counter or the like for counting how many scanning white lines continue. Numeral 6 indicates a clock control circuit which is made responsive to a phase signal, a step termination signal and a transfer signal for selecting a high speed clock $\phi 1$, a low speed clock $\phi 2$ and a step signal. Numeral 7 indicates a phase signal generating circuit for dividing the frequency of the low speed clock $\phi 2$ to produce the phase signal. Numeral 8 indicates an auxiliary scanning mechanism including a stepping motor or the like. Numeral 9 indicates a single signal generating circuit which is made responsive to control a signal according to the counted number of the counter circuit for generating a preset frequency corresponding to the control signal. Numeral 10 indicates a modulating circuit for modulating the picture signal, the phase signal, a white signal or the like. Numeral 11 indicates a gate circuit for selecting one of the modulated signal of the modulating circuit 10 and the single signal 9 over the line to be transmitted to the receiver. Numeral 12 indicates a gate control circuit which is made responsive to a line skipping signal and the low speed clock $\phi 2$ for controlling the gate circuit 11. Numeral 13 indicates a two-input OR gate.

Figure 2:
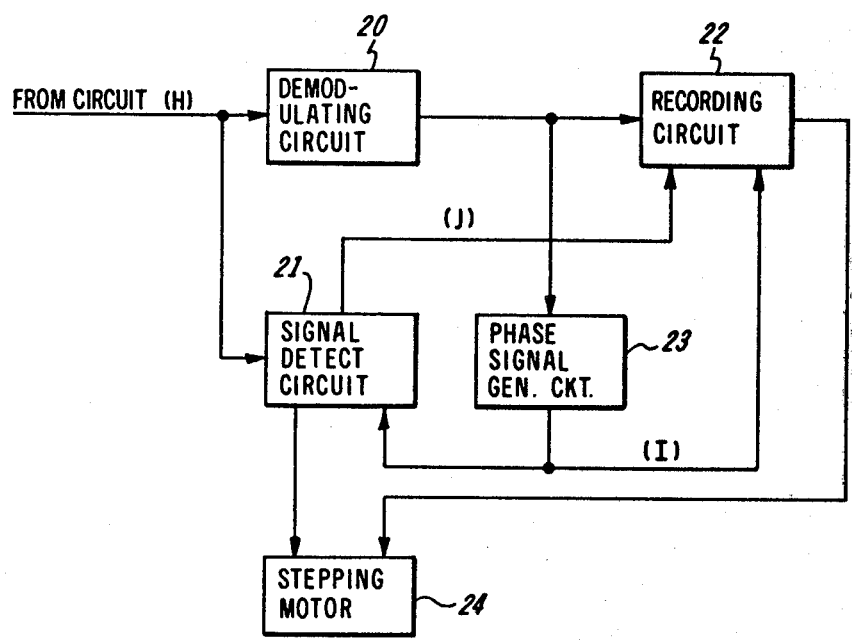
FIG. 2 is a block diagram of a facsimile receiver in accordance with the principles of the present invention.

Turning to FIG. 2 showing the receiver of the facsimile unit in a block diagram: numeral 20 indicates a demodulating circuit; numeral 21 indicates a single signal detecting circuit; numeral 22 indicates a recording circuit including a picture signal amplifying circuit, a memory circuit, a recording head and its drive circuit; numeral 23 indicates a phase signal generating circuit which is made responsive to the phase signal from the transmitter for generating a phase signal at the receiver side; and numeral 24 indicates an auxiliary scanning mechanism including a stepper motor.

The operations of the present embodiment will now be described with reference to the timing chart shown in FIG. 3.

Figure 3:
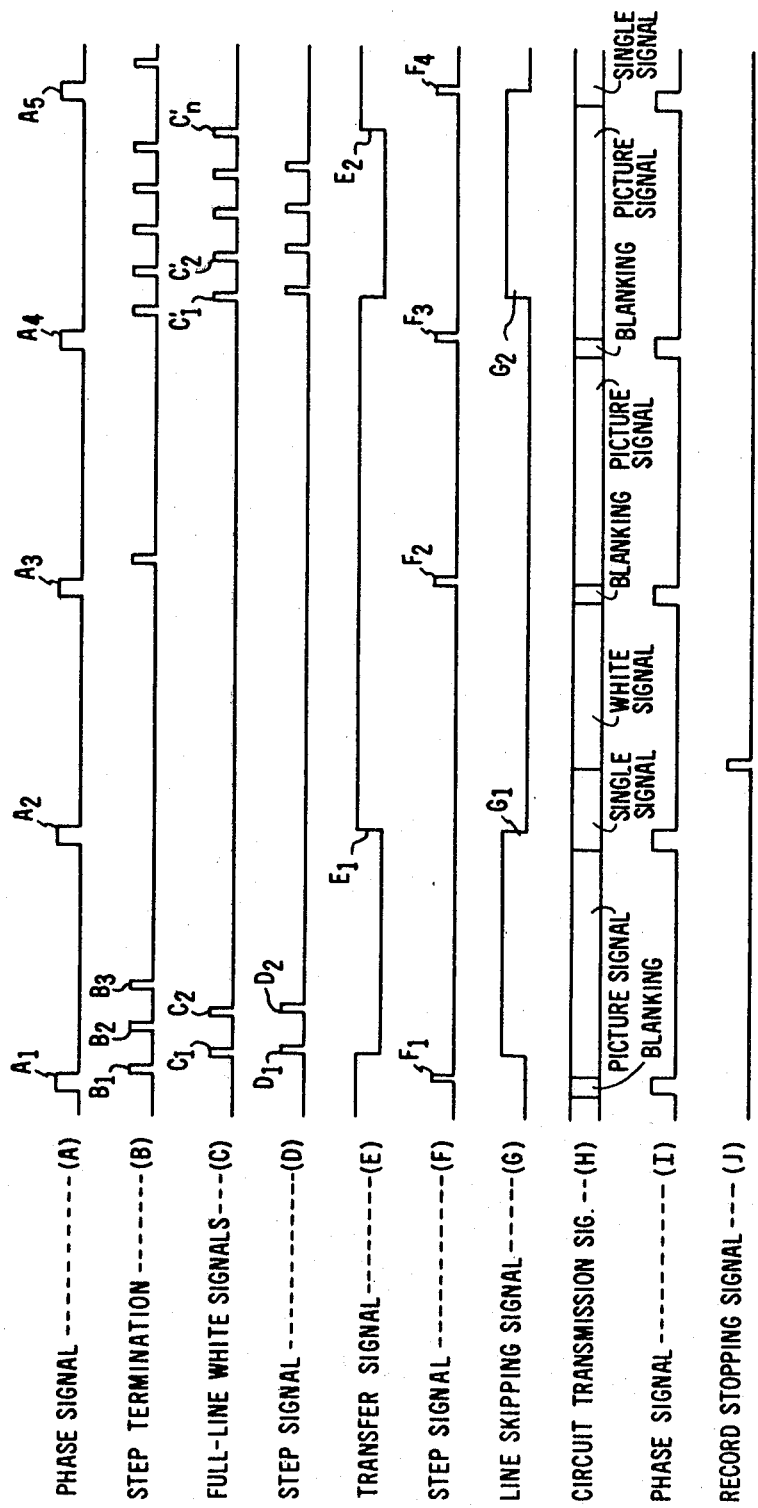
FIG. 3 is a timing chart used in understanding the embodiments of FIG. 1 and FIG. 2.

In FIG. 3: reference letter a indicates a phase signal; letter b indicates a step termination signal; letter c indicates a full-line white signal; letter d indicates a step signal; letter e indicates a transfer signal; letter f indicates a step signal; letter g indicates a line skipping signal; letter h indicates a circuit or transmission line signal; letter i indicates a phase signal; and letter j indicates a record stopping signal. At the location of the transmitter, when the termination of the phase adjusting operation between the transmitter and the receiver is detected, the phase signal a, e.g., $a_1$ is impressed from the phase signal generating circuit 7 upon the counter circuit 5, and this counter circuit 5 is reset, when the phase signal $a_1$ is broken, to prepare the counting operation.

On the other hand, when the termination of the phase adjusting operation is detected, the auxiliary scanning mechanism 8 is stepped one line in response to the step signal f, e.g., $f_1$, which is generated by the clock control circuit 6. When the stepping operation terminates, a step termination signal $b_1$ is impressed from the auxiliary scanning mechanism 8 upon the clock control circuit 6.

This clock control circuit 6 receives the step termination signal $b_1$ so that the picture signal for one scanning line of the document is stored at the rate of the high speed clock $\phi 1$ from the reading scanning circuit 1 in a consecutive manner when the phase signal $a_1$ is lowered to an "L" level. This picture signal for one scanning line of the copy is impressed upon the detecting circuit 4, too, so that whether or not the picture signal for one scanning line is the full-line white signal being tested. If this test reveals that the picture signal for one scanning line is the full-line white signal, a full-line white signal $c_1$ is generated by the testing circuit 4. This full-line white signal $c_1$ sets the counter circuit 5 to the count of one.

After the count setting operation terminates, the counter circuit 5 impresses a one scanning step signal $d_1$ upon the auxiliary scanning mechanism 8 through the gate 13 so that the auxiliary scan for one line is stepped. When this stepping operation of one line terminates, a step termination signal $b_2$ is impressed from the auxiliary scanning mechanism 8 upon the clock control circuit 6. Since, at this time, the phase signal a is at the "L" level, the picture signal for the next scanning line is consecutively stored again from the reading scanning circuit 1 in the memory circuit 2 at the rate of the clock $\phi 1$. The contents of the memory circuit 2 is renewed by that rememorization.

The picture signal read out again is also tested by the testing circuit 4 so that another full-line white signal $c_2$ is generated by the testing circuit 4 in a similar manner to the aforementioned one if the picture signal for one scanning line is the full-line white signal, that is, no black information is detected. As a result, the counter circuit 5 is further counted up by one so that the auxiliary scan is stepped for one line.

Thus, the operations thus far described are repeated until a black picture signal is detected on a line and until the counter circuit 5 reaches a preset count number. Incidentally, the count number, which can be preset in the counter circuit 5, is determined by how many times the aforementioned operations can be accomplished while the phase signal a is at the "L" or low level.

Now, when the picture signal of the line read out by a step termination signal $b_3$ is tested and found to contain a black picture signal by the testing circuit 4, the full-line white signal c is not generated. As a result, the counter circuit 5 is not counted up but holds for how many lines the white signal has existed. At this time, the counter circuit 5 does not operate. As a result, since the step signal d is not applied to the auxiliary scanning mechanism 8, neither the stepping operation of the auxiliary scan nor the reading operation of the next line is performed. As a result, the memory circuit 2 has the black picture signal memorized therein to stop its operation. Since the step signal d is not generated even when the preset count number is reached, the stepping operation of the auxiliary scan is not performed so that the operation is stopped in a similar manner to the above.

Thus, the following operations are performed by counting and memorizing the number of the full-line white signals c, which are tested during the period while the phase signal a is at the "L" or low level, at the counter circuit 5. Incidentally, the preset count number is denoted as the letter n.

When the counted value in the counter circuit 5 ranges from 1 to $(n-1)$, i.e., when the counted value is "2" as set forth in the aforementioned example, a control signal according to the count number "2" is impressed from the counter circuit 5 upon the single signal generating circuit 9 through a latch circuit 14. On the other hand, a line skipping signal $g_1$ is impressed through a latch circuit 15 upon the gate control circuit 12 and the modulating circuit 10. When the phase signal a rises to an "H" or high level so that a signal $a_2$ is generated, the single signal generating circuit 9 oscillates a single signal having a preset frequency corresponding to the count number "2" and impresses it upon the gate circuit 11. On the other hand, the modulating circuit 10 modulates the white signal and impresses it upon the gate circuit 11. These single signal and white signal are held until a next phase signal $a_3$ rises to the "H" level.

The gate control circuit 12 transmits the output of the modulating circuit 10 to the transmission line, as indicated by the circuit transmission signal h in FIG. 3, a preset time after the phase signal $a_2$ rises to the "H" level. The time period for which the single signal and modulated signal are transmitted is set to continue until the next phase signal $a_3$ rises to the "H" level. Since the counter circuit 5 is reset by the break of the phase signal $a_2$ while the single signal and the modulated signal are being transmitted to the circuit, the subsequent operation to be performed is that when the count number of the counter circuit 5 is zero. When the count number of the counter circuit 5 becomes zero, the transfer signal e is generated by the counter circuit.

The operations when the count number of the counter circuit 5 is at zero will now be described. At this time, a transfer signal $e_1$ is impressed from the counter circuit 5 upon the clock control circuit 6. During the time period while the phase signal $a_3$ is at the "H" level, the clock control circuit 6 consecutively transfers the picture signal for one scan line at the high speed clock $\phi 1$ from the memory circuit 2 to the memory circuit 3. When the phase signal $a_3$ is lowered to the "L" level, the picture signal is read out of the memory circuit 3 at the low speed clock $\phi 2$ from the clock control circuit 6 and is modulated by the modulating circuit 10 until it is fed out to the circuit through the gate circuit 11.

When the transfer from the aforementioned memory circuit 2 to memory circuit 3 terminates, a step signal $f_2$ is fed from the clock control circuit 6 to the auxiliary scanning mechanism 8 through the gate 13 so that the testing operation for testing for how many lines the signal is the full-line white signal is performed while the picture signal is being read out of the memory circuit 3.

Next, when the counter circuit 5 has the count number n, i.e., when a full-line white signal c'n is generated, a transfer signal $e_2$ is impressed from the counter circuit 5 upon the clock control circuit 6 so that the control signal according to the count number is impressed upon the single signal generating circuit 9. On the other hand, a line skipping signal $g_2$ is impressed upon the gate control circuit 12 and the modulating circuit 10. When a phase signal $a_5$ rises to the "H" level, the single signal generating circuit 9 oscillates the single signal according to the count number and feeds it to the gate circuit 11. The modulating circuit 10 modulates the white signal and feeds it to the gate circuit 11.

The single signal and white signal are held until a next phase signal $a_6$ (although not shown) rises to the "H" level. The gate control circuit 12 transmits the output of the single signal generating circuit 9 to the output transmission circuit during a preset time period after the phase signal $a_5$ rises to the "H" level, and transmits the output of the modulating circuit 10 to the circuit after the preset time period elapses. The time period, for which the single signal and the modulated signal are being transmitted, is set to continue until the next (not-shown) phase signal $a_6$ rises to the "H" level. Since the transfer signal $e_2$ is impressed upon the clock control circuit 6 before the single signal and the modulated signal are transmitted to the circuit, the picture signal is transferred from the memory circuit 2 to the memory circuit 3 during the time period with the phase signal $a_5$ being at the "H" level while the single signal and the modulated signal are being transmitted. After this transfer, a step signal $f_4$ is impressed from the clock control circuit 6 through the gate 13 upon the auxiliary scanning mechanism 8 so that the testing operation for testing how many lines the signal is the full-line white signal is performed.

In this way, for how many lines the signal is the full-line signal is consecutively tested so that the single signal and the white signal are transmitted to the circuit if the full-line white signal is detected and so that the actual line picture signal is transmitted to the circuit if a black picture signal is detected.

At the receiver, the circuit transmission signal h transmitted from the transmitter is demodulated by the demodulating circuit 20 so that the picture signal is started to be consecutively stored in the memory circuit of the recording circuit 22 when the phase signal i of the phase signal generating circuit 23 rises to the "H" level. On the other hand, the single signal detecting circuit 21 detects the single signal for a preset time period after the phase signal i rise to the "H" level. This preset time period is made substantially the same as the transmission period of the single signal, which is set at the transmission side.

If the single signal is detected, the single signal detecting circuit 21 feeds the record stopping signal j to the recording circuit 22 so that the start of the recording operation is stopped. In accordance with the frequency of the single signal, the control signal for how many lines are skipped is impressed upon the auxiliary scanning mechanism 24 so that the skip of the auxiliary scan is performed.

Since the record stopping signal j is not generated when the single signal is not detected during the single signal detecting period, the recording circuit starts its recording operation. When the recording circuit 22 completes its recording operation, the step signal for one line is impressed from the recording circuit 22 upon the auxiliary scanning mechanism 24 so that this auxiliary scanning mechanism 24 performs the stepping operation for one line.

In the embodiment thus far described, incidentally, how many lines are to be skipped is designated in accordance with the frequency of the single signal which is generated by the single signal generating circuit 9. In the alternative, however, the single signal generating circuit 9 may be replaced by an oscillator, which is made operative to generate a signal having a preset frequency irrespective of the counted value of the counter circuit 5, to control the time period for rendering the gate circuit 11 nonconductive in accordance with the aforementioned counted value so that how many lines are to be skipped may be designated in accordance with the time length.

As has been described hereinbefore, according to the present invention, since the auxiliary scan control signal for effecting the skipping operation is transmitted for a preset time period from the beginning of the phase signal, many kinds of skip controls can be accomplished, and the line skipping operations can be sufficiently accomplished even if a blank space continuously appears in a copy. At the side of the receiver, moreover, the recognition between the auxiliary control signal and the picture signal is so facilitated that the present device can be suitably applied to the auxiliary scan control device for a facsimile.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A facsimile system which allows faster scanning and transmission of information on a document by skipping over blank areas on said document and comprises a phase signal generating circuit (7) for generating a phase signal, a reading scanning circuit (1) for reading an original document, memory circuits (2, 3) for storing an image signal for one line, a detecting circuit (4) for testing whether or not the image signals for one line are all white signals, a counting circuit (5) for counting signals being generated by the detecting circuit, a scanning mechanism (8) for performing skips by one line on the original document, a clock controlling circuit (6) for controlling the reading scanning circuit (1), the memory circuits (2, 3) and the sub-scanning circuit (8), an oscillator circuit (9) being controlled by the counted value of the counting circuit (5), and a gate controlling circuit (12) being controlled by the count value in said counter circuit, wherein the improvement is characterized by the content of the image information having been obtained by the prior scanning of one line is sequentially tested by the detecting circuit (4), the scanning mechanism being advanced by one line when the information having been detected is one to be skipped, the number of lines to be consecutively skipped being counted by the counter, the phase signal and the image signal being transmitted when the counted value is 0, and the scanning controlling signal corresponding to the counted value being transmitted from the beginning of the phase when the counted value is equal to or more than 1.

2. The facsimile system as set forth in claim 1 further including a signal detecting circuit (21) for detecting the white line count signal, a recording circuit (22) including a picture signal amplifying circuit, a memory circuit, a recording head and a recording head drive circuit, a phase signal generating circuit (23) for generating a phasing signal and scanning means (24) including a stepping motor, such that the white line count signal detected by the detecting circuit 21 ceases the recording operation of the recording circuit (22) and initiates the operation of the scanning means (24) to skip the requisite number of scan lines detected by the detecting circuit (21).

3. A facsimile transmitter for skipping over blank areas on a document comprising read scanning means (1) for reading an original document, memory means (2, 3) for storing an image signal for one scan line, detecting circuit means (4) for testing whether the image signals for one scan line are all white signals, counting circuit means (5) for counting signals being generated by the detecting circuit means (4), scanning mechanism means (8) for stepping the document by incremental steps, wherein the improvement is characterized by:
   clock controlling circuit means (6) for selectively controlling the read scanning means (1), the memory means (2, 3), and the scanning mechanism means (8),
   oscillator circuit means (9) for generating predetermined frequency signals in response to the counted value of said counting circuit means (5), and
   gate controlling circuit means (12) responsive to the count value in said counting circuit means (5) for selectively allowing the transmission of said predetermined frequency signals when the counted value in said counting circuit means (5) is equal to or greater than one or the transmission of the image signals when the counted value in said counting circuit means (5) is zero.

4. The facsimile transmitter of claim 3 wherein the content of the image information is sequentially tested by said detecting circuit means (4), said scanning mechanism means (8) being advanced by one line when the information having been detected is one line to be skipped, the number of lines to be consecutively skipped being counted by the counter.

5. The facsimile transmitter as set forth in claim 4 further including phase signal generating circuit means (7) for synchronizing a facsimile receiver with said facsimile transmitter.

6. The facsimile transmitter as set forth in claim 5 wherein said clock controlling circuit means (6) generates a high speed clock signal and a low speed clock signal, said high speed clock signal being used when scanning said document and storing the image signals for each scan line, and said low speed clock signal being used when transmitting the image picture signals.

7. The facsimile transmitter as set forth in claim 6 further including modulating circuit means (10) for modulating said image picture signals prior to transmission.

8. The facsimile transmitter as set forth in claim 7 further including output circuit means (11) for selectively transmitting the modulated image picture signals and the predetermined frequency signals from said oscillator circuit means (9) under control of the gate controlling circuit means (12).

* * * * *